March 14, 1967     F. SKRBINA     3,309,662
SEAT BELT REMINDER SYSTEM
Filed Dec. 26, 1963     2 Sheets-Sheet 1
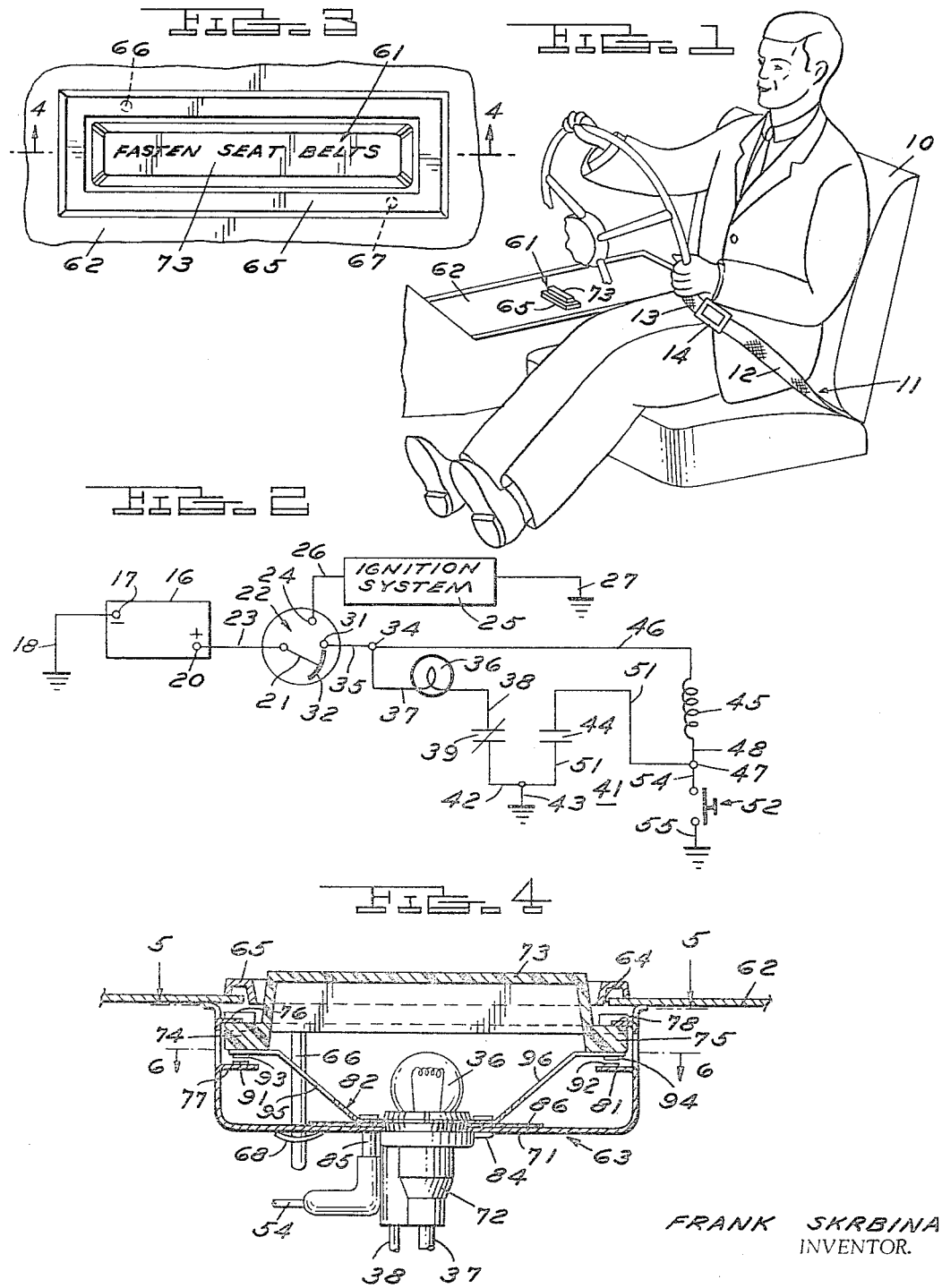
FRANK SKRBINA
INVENTOR.
BY John R. Faulkner
Keith L. Zerschling
ATTORNEYS March 14, 1967   F. SKRBINA   3,309,662
SEAT BELT REMINDER SYSTEM
Filed Dec. 26, 1963   2 Sheets-Sheet 2
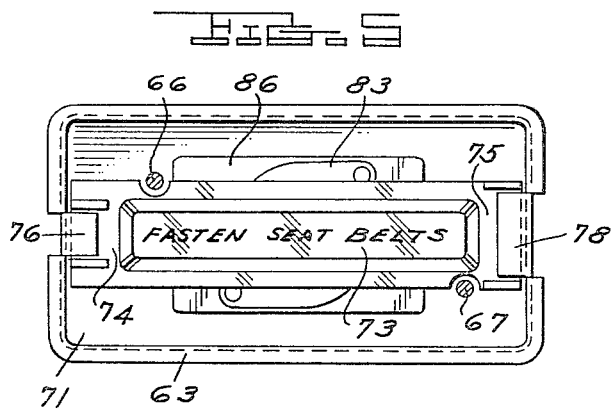
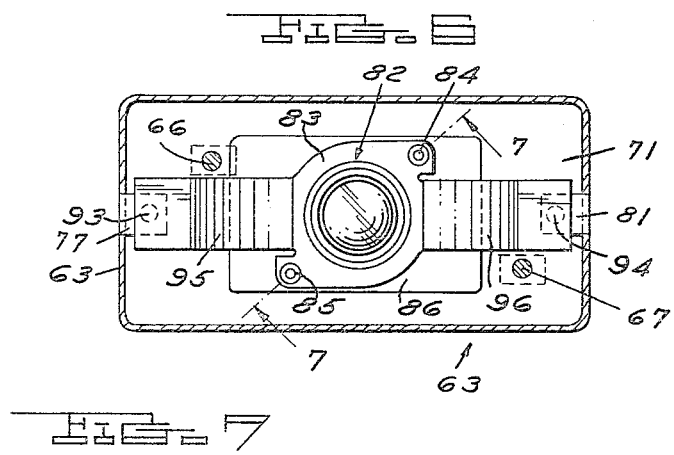
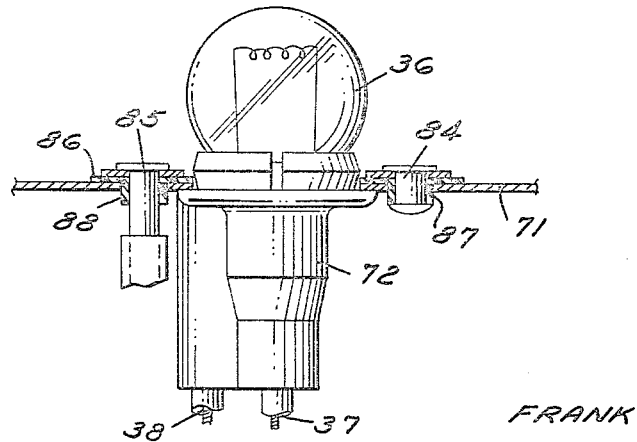
FRANK SKRBINA
INVENTOR.

United States Patent Office 3,309,662
Patented Mar. 14, 1967

3,309,662
SEAT BELT REMINDER SYSTEM
Frank Skrbina, Dearborn, Mich., assignor to The Ford Motor Company, Dearborn, Mich., a corporation of Delaware
Filed Dec. 26, 1963, Ser. No. 333,556
3 Claims. (Cl. 340—52)

This invention relates to a seat belt reminder system that will remind an occupant of an automotive vehicle to fasten his seat belt and to a combination switch and warning lamp assembly suitable for use in such a system.

The motoring public has become increasingly aware of the value of providing safety seat belts for use in automotive vehicles, and an increasing number of vehicle buyers have incorporated seat belts in their vehicles. It is obvious that such people wish to fasten their seat belts each time they enter the vehicle, but in the absence of some device to remind them, they often neglect to do so and the seat belts remain unused during long periods of time.

The present invention is designed to remind the vehicle occupants to fasten their seat belts. It includes a warning lamp that is energized each time the ignition switch is closed. This warning lamp is de-energized by an affirmative act on the part of the vehicle driver or other vehicle occupant and it will remain de-energized until the ignition switch is again opened and re-closed. This reminding system will be effective in the majority of instances to remind the vehicle operator, or other occupant of the vehicle, to fasten his seat belt.

More particularly, the invention takes the form of a warning lamp that is connected in circuit with the ignition switch and the battery of an automotive vehicle. Means are provided for keeping the warning lamp energized until an affirmative act is accomplished by the vehicle driver or occupant. In the preferred embodiment of the invention a relay is employed and a push button switch is positioned in series with the relay winding. The relay has a normally closed set of contacts and a normally open set of contacts. The normally closed set of contacts is positioned in circuit with the warning lamp and keeps the warning lamp energized as long as the relay winding is unenergized. When the push button switch is actuated it operates through the relay winding to open this normally closed set of contacts and to close a normally open set of contacts. The normally open set of contacts is positioned in series with the relay winding, the ignition switch and the battery of the vehicle, and this keeps the relay winding energized, thereby keeping the normally closed set of contacts open and the warning lamp de-energized. When the ignition switch is opened, the relay winding is de-energized and both sets of contacts are returned to their normal positions. The system is then in a position to re-energize the warning lamp when the ignition switch is again closed.

The invention also relates to a combination warning lamp and switch assembly that includes the push button switch referred to above. It comprises a portion of the warning lamp housing and lens system. In this system the lens is mounted for limited movement within its housing, and is spring loaded into its normal position. When the lens is moved a short distance by a vehicle occupant, it closes a set of contacts and this action brings about the de-energization of the warning lamp as stated. Preferably this lens has a rectangular configuration and includes the words "Fasten Seat Belts" inscribed on it so that when the warning lamp is energized the words "Fasten Seat Belts" will become readily visible to the vehicle occupants. It is preferred to use a leaf spring to spring load the lens and this leaf spring has a reflective surface that serves as a reflector for the warning lamp.

An object of the invention is a provision of a reminder system for reminding the occupants of an automotive vehicle to fasten their seat belts.

Another object of the invention is the provision of a reminder system for reminding vehicle occupants to fasten their seat belts in which an affirmative act on the part of the vehicle occupant is necessary to de-energize a reminder device.

A further object of the invention is the provision of a novel and unique switching means in a reminder system in an automotive vehicle for reminding vehicle occupants to fasten their seat belts, which is effective and uses a minimum number of parts.

Another object of the invention is the provision of a combination warning lamp and switch arrangement in an automotive vehicle in which actuation of the switch de-energizes the warning lamp.

Further objects and attendant advantages of the present invention will become more apparent as the specification is considered in connection with the attached drawings in which:

FIGURE 1 is a perspective view of an automotive vehicle driver and his surrounding environment showing the location of the reminder device in an automotive vehicle;

FIGURE 2 is an electrical schematic diagram of the seat belt reminder system of the present invention;

FIGURE 3 is a top plan view of the seat belt warning lamp and switch arrangement shown mounted in a vehicle console;

FIGURE 4 is a longitudinal view of the warning lamp and switch arrangement taken along the line 4—4 of FIGURE 3;

FIGURE 5 is a top plan view of the warning lamp and switching arrangement shown in FIGURES 3 and 4 with the surrounding bezel of the switch removed;

FIGURE 6 is a view taken along the line 6—6 of FIGURE 4, and

FIGURE 7 is a sectional view, partially in elevation, taken along the line 7—7 of FIGURE 6.

Referring now to the drawings in which like reference numerals designate like parts throughout the several views thereof, there is shown in FIGURE 1 a vehicle seat 10 that is designed to position the driver of the vehicle properly before the vehicle control system. As shown, a seat belt 11 is adapted to be positioned about the driver of the vehicle and to hold him in a restrained position should the vehicle be involved in any type of an accident. As is usual in automotive seat belts, the seat belt 11 comprises a first section 12 and a second section 13 that are designed to be fastened together by a seat belt buckle 14. It can be readily appreciated that the vehicle may contain other seat belts that are adapted to be positioned about the other vehicle occupants or passengers. It often occurs that the vehicle driver or other occupant will forget to fasten his seat belt when he enters the vehicle. The present invention is designed to remind the vehicle driver, or other occupant, to fasten his seat belt and this reminder is given when the ignition switch of the vehicle is closed or turned to the "on" position.

Referring now to FIGURE 2, there is shown a schematic electrical diagram of the present invention in which a source of electrical energy in the form of a vehicle storage battery 16 has one terminal 17 connected to ground through a lead 18. The other terminal 20 of the vehicle storage battery is connected to a movable arm 21 of ignition switch 22 through a lead 23. As is usual in automotive vehicles, the ignition switch 22 has an "on" terminal connected to the ignition system 25 of the vehicle through a lead 26. The ignition system 25 also is connected to ground through a lead 27.

The accessory terminal 31 of the ignition switch will be energized any time the ignition switch 22 is closed or turned to the "on" position. This can be accomplished, for example, by a conductive blade 32 that will be placed in contact with both the "on" terminal 24 and the accessory terminal 31 any time that the switch is turned to the "on" position. The accessory terminal 31 is connected to a junction 34 by means of a lead 35 and the junction 34 is connected to a warning device, preferably in the form of a lamp 36, by means of a lead 37. The other terminal of the warning device or lamp 36 is connected to ground through lead 38, a set of normally closed contacts 39 of relay 41, and leads 42 and 43. The relay 41, in addition to having the normally closed set of contacts 39, includes a normally open set of contacts 44 and a relay winding 45. One end of the relay winding 45 is connected to the junction 34 through a lead 46 while the other end is connected to a junction 47 through a lead 48. The junction 47 is connected to the normally open set of contacts 44 and the normally open set of contacts 44 is connected to ground through lead 51 and the lead 43. The junction 47 is also adapted to be connected to ground through a push button switch 52 that connects the relay winding 45 to ground through the lead 48, junction 47, and leads 54 and 55.

In operation, it can readily be appreciated that the warning device or lamp 36 is energized when the ignition switch 22 is moved to the "on" position. At this time a series circuit is completed from the battery 16 through the movable arm 21 and conductive blade 32 of ignition switch 22, accessory terminal 31, the warning lamp or device 36 and the normally closed set of contacts 39 of the relay 41. As a result, the warning lamp 36 will be energized each time the ignition switch 22 is moved to the "on" position.

In order to de-energize the warning lamp 36 the push button switch 52 must be actuated. Actuation of the push button switch 52 energizes relay winding 45 from the terminal 31 of the ignition switch 22 (assuming the ignition switch to be in the "on" position), through the lead 35 and lead 46, since the junction 47 is grounded through lead 54, push button switch 52 and lead 55. This action opens the normally closed set of contacts 39 of the relay 41, and closes the normally open set of contacts 44. As a result the warning lamp or device 36 is deenergized and the junction 47 is grounded through lead 51, contacts 44, leads 51 and 43. The relay winding 45 will remain energized, therefore, when the push button switch 52 is opened and will remain so energized until the ignition switch 22 is returned to the "off" position at which time the accessory terminal 31 is de-energized. Returning the ignition switch 22 to the "off" position will close the normally closed set of contacts 39, open the normally open set of contacts 44 and reset the reminder system in position so that the warning device or lamp 36 will be re-energized when the ignition switch 22 is again closed.

Warning lamp or device 36 and the push button switch 52 are combined into a combination warning lamp and switch assembly 61 that is positioned adjacent the vehicle driver or other vehicle occupant, for example, on a sheet metal console 62 so that it is readily accessible to the driver or other vehicle occupant when the driver or other vehicle occupant has his seat belt fastened. Referring to FIGURE 4, this combination warning lamp and switch assembly 61 includes a rectangular sheet metal housing 63 held in position on the under side of a rectangular opening 64 in the sheet metal console 62 by means of a bezel 65. This bezel 65 has a pair of integrally formed and depending stud members 66 and 67 that extend through the sheet metal housing 63. Fastening means 68 secure the housing 63 to the bezel 65 and to the sheet metal console 62. One wall 71 of the housing 63, as shown in FIGURES 4 and 7, receives a push-in type electrical socket 72 for the warning lamp 36. The warning lamp 36 is connected to be energized through the leads 37 and 38 that protrude from the socket 72.

A lens 73 of rectangular form is positioned opposite the warning lamp 36 and is in the form of a rectangular box that is open on the side that faces the warning lamp 36. The face of the lens 73, as seen in FIGURE 3, has the words "Fasten Seat Belts" inscribed thereon so that it reminds the driver of the vehicle and other occupants to fasten their seat belts when the warning lamp 36 is energized. The lens 73 is preferably made of a plastic material and is colored red. The lens 73 has a pair of protruding side flanges 74 and 75 that are positioned between struck-out tabs 76, 77 and 78 and 81 respectively of the sheet metal housing 63.

A leaf spring member 82 has a base portion 83 that surrounds the socket 72 secured to the wall 71 of the sheet metal housing 63 by a rivet 84 and a terminal 85. An insulator 86 insulates the leaf spring member 82 including the base 83 from the wall 71 of the sheet metal housing 63, and this insulator member includes protruding annular flanges 87 and 88 that insulate the rivet 84 and the terminal 85 from the wall 71.

The struck-out tabs 77 and 81 of the sheet metal housing 63 carry contacts 91 and 92 that are adapted to engage contacts 93 and 94, carried by arms 95 and 96 of the leaf spring member 82, as shown in FIGURE 4. The leaf spring member 82, through the arms 95 and 96, urges or biases the flanges 74 and 75 of the lens 73 into engagement with the struck-out tabs 76 and 78 of the sheet metal housing 63. In this position the contacts 91 and 93, 92 and 94, are not in engagement. These contacts may be brought into engagement by moving the lens 73 toward the warning lamp 36 and the wall 71 of the sheet metal housing 63 against the bias of arms 95 and 96 of the leaf spring member 82. Thus the lens 73 and the leaf spring 82, together with contacts 91 through 94, form the push button switch shown in FIGURE 2. It may be seen that the lead 54, as shown in FIGURE 2, is connected to the leaf spring member, including arms 95 and 96, through the terminal 85. The sheet metal housing 63 and the console 62 serve as the ground member for the push button switch, with the housing 63 serving as the lead 55, shown schematically in FIGURE 2.

The arms 95 and 96 and the base 83 of the leaf spring 82 serve not only as current carrying members for the push button switch arrangement 52, but also serve as reflectors for the light emitted by the warning lamp 36. This can most readily be seen by reference to FIGURES 5 and 6 in which the leaf spring 82 is shown and it can be seen by reference to these figures that the base member 83 of the leaf spring 82 as well as the arms 95 and 96 extend opposite the face of the lens 73 and thus serve to reflect light emitted from warning lamp 36 through the front of the lens. It will be understood that the surface of the leaf spring member 82 that faces the lens 73 should be constructed of, or coated by, a material capable of reflecting light.

Referring now to FIGURE 1, it can be appreciated that the combination push button switch and warning lamp assembly 61 is positioned closely adjacent the vehicle driver. When the vehicle driver turns the ignition switch to the "on" position, the warning lamp 36 will be energized and the lens 73 will be illuminated so that the inscription "Fasten Seat Belts" on the face of the lens 73 will become readily visible to the driver. This will remind the vehicle driver to fasten his seat belt, and when he has done so, he may de-energize the warning lamp 36 by the simple expedient of pushing on or depressing the lens 73 against the bias of the leaf spring member 82. The warning lamp 36 will remain de-energized until the ignition switch is opened, or turned to the "off" position, and is again closed or turned to the "on" position. It is apparent that other vehicle occupants, for example, the passenger located in the front seat of the vehicle, may also take advantage of the warning provided by the invention since this passenger will be in a position to see the warning to actuate the combination push button switch and warning lamp assembly 61.

It can be readily appreciated from the foregoing description that the present invention provides a convenient and reliable reminder system for reminding the vehicle occupants to fasten their seat belts. This system includes a warning lamp that is energized when the ignition switch is turned to the "on" position with a vehicle occupant actuated means in the form of the push button switch arrangement described for de-energizing the lamp and keeping the lamp de-energized until the ignition switch is opened and again closed.

The invention also provides a unique combination warning lamp and switch arrangement that is capable of use in other reminder or warning systems.

It is to be understood that this invention is not to be limited to the exact construction shown and described but that various changes and modifications may be made without departing from the spirit and scope of the invention as defined in the appended claims.

I claim:

1. In an automotive vehicle, a reminder system for reminding a vehicle occupant to fasten his seat belt comprising a warning device, a source of electrical energy, an ignition switch, a relay having a winding, a normally closed set of contacts, and a normally open set of contacts, circuit means connecting said warning device, said source of electrical energy, said ignition switch and said normally closed set of contacts of said relay in series circuit whereby said warning device is energized when said ignition switch is closed, a push button switch, circuit means connecting said source of electrical energy, said ignition switch, said relay winding and said push button switch in series circuit whereby said relay winding is energized, said normally closed contacts are opened, said warning device is de-energized, and said normally open contacts are closed when said push button switch is actuated while said ignition switch is closed, said normally open set of contacts positioned in parallel circuit with said push button switch for keeping said relay winding energized, said normally open set of contacts closed and said warning device de-energized until said ignition switch is opened and re-closed.

2. In an automotive vehicle, a reminder system for reminding a vehicle occupant to fasten his seat belt comprising, a source of electrical energy, a warning lamp, an ignition switch, circuit means connecting said source of electrical energy, said warning lamp and said ignition switch for energizing said warning lamp when said ignition switch is closed, a housing for said warning lamp, said housing including a wall supporting said warning lamp, a leaf spring affixed to said wall adjacent said warning lamp, a lens positioned opposite said wall and mounted in said housing for limited movement toward and away from said wall and said warning lamp, said leaf spring engaging said lens and urging said lens away from said wall and said warning lamp, stop means carried by said housing and engaging said lens for limiting the movement of said lens in a direction away from said wall and said warning lamp, normally open switch contacts carried by said spring and said housing, said contacts being closable when said lens is moved toward said wall of said housing and said warning lamp by a vehicle occupant, and circuit means coupled to said source of electrical energy, said ignition switch, said warning lamp and said switch contacts for de-energizing said warning lamp when said switch contacts come into engagement as a result of the movement of said lens by a vehicle occupant, said circuit means including means for maintaining said warning lamp de-energized after said lens moves back to its original position and said switch contacts are opened under the urging of said spring.

3. In an automotive vehicle, a reminder system for reminding a vehicle occupant to fasten his seat belt comprising, a source of electrical energy, a warning lamp, an ignition switch, circuit means connecting said source of electrical energy, said warning lamp and said ignition switch for energizing said warning lamp when said ignition switch is closed, said warning lamp having a spring loaded movable lens positioned adjacent the vehicle occupant, a normally open switch, means coupling said normally open switch and said spring loaded movable lens for closing said normally open switch when said lens is moved by a vehicle occupant in response to the energization of said warning lamp, and circuit means coupling said source of electrical energy, said ignition switch, said warning lamp and said normally open switch for de-energizing said warning lamp when said normally open switch is closed, said circuit means including means for maintaining said warning lamp in a de-energized state after said normally open switch is opened and until said ignition switch is opened and re-closed.

References Cited by the Examiner
UNITED STATES PATENTS

| | | | |
|---|---|---|---|
| 790,548 | 5/1905 | Atwood | 340—286 |
| 1,434,795 | 11/1922 | Ryder | 340—286 |
| 2,275,883 | 3/1942 | Bany. | |
| 2,638,580 | 5/1953 | Lovejoy. | |
| 2,735,081 | 2/1956 | Hosford | 340—213.1 X |
| 2,780,801 | 2/1957 | Tyler | 340—214 |
| 2,824,293 | 2/1958 | Meinhardt | 340—278 X |
| 2,917,731 | 12/1959 | Rodgers. | |
| 2,924,817 | 2/1960 | Dawkins | 340—278 X |
| 2,934,752 | 4/1960 | Arrosmith | 340—213.1 X |
| 2,942,249 | 6/1960 | Paull | 340—327 X |
| 3,112,467 | 11/1963 | Benning | 340—52 |
| 3,200,370 | 8/1965 | Rush | 340—52 |
| 3,179,777 | 4/1965 | Rohacs | 200—167 |
| 3,192,352 | 6/1965 | Piber | 200—167 |

NEIL C. READ, *Primary Examiner.*

R. GOLDMAN, A. H. WARING, *Assistant Examiners.*